3,248,363
COLOR STABILIZATION OF POLYMERIZABLE HETEROCYCLIC NITROGEN COMPOUNDS BY FORMALDEHYDE
Milton Farber, Verona, and Robert Miller, Bloomingdale, N.J., assignors to United States Rubber Company, New York, N.Y., a corporation of New Jersey
No Drawing. Filed Sept. 5, 1962, Ser. No. 221,452
21 Claims. (Cl. 260—45.9)

This invention relates to a method of stabilizing polymerizable heterocyclic nitrogen compounds to prevent color formation. The method involves the addition of stabilizers which provide formaldehyde in contact with the polymerizable compounds. The invention also relates to the polymerizable heterocyclic nitrogen compounds so stabilized. Another aspect of the invention relates to a method of forming color stabilized polymers of polymerizable heterocyclic nitrogen compounds, and also relates to the polymers so formed.

It is well known that polymerizable heterocyclic nitrogen compounds, such as vinylpyridines, have a tendency to discolor badly during storage. This characteristic is obviously undesirable, particularly so when such nitrogen compounds are to be employed for the preparation of polymers to be used in the manufacture of lightly colored products, such as films or textile fibers.

Another problem associated with the storage of polymerizable heterocyclic nitrogen compounds is that such materials tend to undergo spontaneous polymerization. Accordingly, inhibitors are generally added to these nitrogen compounds to prevent such polymerization and to maintain the compounds in the monomeric form. Such inhibitors generally do not prevent the color degradation of the nitrogen compounds.

In order to utilize the nitrogen compounds for the production of polymers, it has heretofore been necessary to subject the nitrogen compounds to distillation to remove the inhibitors. Although simpler, more economical methods are available for removing the inhibitors, these methods have not proved feasible because of the presence of color bodies, which must also be removed prior to polymerization.

In the manufacture of polymers of polymerizable heterocyclic nitrogen compounds, the presence of a small amount of monomeric materials in the polymers is unavoidable. Accordingly, these monomers tend to discolor and therefore the polymer itself becomes colored. This is obviously a disadvantage if the polymers are to be used for the manufacture of lightly colored products such as films or textile fibers and the like.

One family of polymerization inhibitors, comprising the hydroxylamines, N-substituted hydroxylamines, and their acid salts, do protect heterocyclic nitrogen compounds of the type considered here against color degradation. However, because these compounds are polymerization inhibitors they must be removed from the nitrogen compounds before the latter can be polymerized and therefore cannot prevent degradation during and after the polymerization step.

Accordingly, it is an object of the present invention to provide a method for inhibiting color formation in polymerizable heterocyclic nitrogen compounds.

It is another object of this invention to provide a color-stabilized composition comprising a polymerizable heterocyclic nitrogen compound.

It is a further object of this invention to provide a method of producing color-stabilized polymers formed from polymerizable heterocyclic nitrogen compounds.

The present invention is predicated on the discovery that formaldehyde serves to inhibit color formation in polymerizable heterocyclic nitrogen compounds such as vinylpyridines. It has been determined that such stabilization may be accomplished by addition of formaldehyde itself, or by particular reagents which release formaldehyde. Specifically, such formaldehyde-releasing reagents include paraformaldehyde, formalin, sodium formaldehyde sulfoxylate, and methylol-ureas.

Preferred polymerizable heterocyclic nitrogen compounds which are color stabilized in accordance with the present invention are the monovinyl- and divinyl-pyridines, with the vinyl group being present in any of the several positions in the pyridine nucleus. Alkyl groups can be present on the ring or on the alpha or beta carbon atom of the vinyl group. Such alkyl groups may consist of up to 20 carbon atoms each.

The preferred vinylpyridine compounds have the following structural formula:

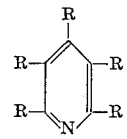

where R is selected from the group consisting of hydrogen, alkyl, vinyl, alpha-alkyvinyl and beta-alkylvinyl groups, at least one and not more than two of said groups being vinyl, alpha-alkylvinyl or beta-alkylvinyl, and the number of carbon atoms in the respective alkyl groups being not more than 20. Examples of such compounds are 2-vinylpyridine, 3-vinylpyridine, 4-vinylpyridine, 2-methyl-5-vinylpyridine, 2-beta-ethyl-vinylpyridine, 2-vinyl-5-ethyl-pyridine, 2,3,4-trimethyl-5-vinylpyridine, 3,4,5,6-tetramethyl-2-vinylpyridine, 3-ethyl-5-vinylpyridine, 2,6-diethyl-4-vinylpyridine, 2-isopropyl-4-nonyl-5-vinylpyridine, 2-methyl-5-undecyl-3-vinylpyridine, 2,4-dimethyl-5,6-dipentyl-3-vinylpyridine, 2-decyl - 5 - (alpha-methylvinyl)pyridine, 3-5-di(alpha-methylvinyl)pyridine, 2-4-divinylpyridine, 2,5-divinylpyridine, and the like.

Other polymerizable heterocyclic nitrogen compounds which may be treated in accordance with the present invention include those compounds in which the ring structure is unsaturated, partially saturated, or completely saturated. Examples of these are vinylpyrroles, vinylpiperidines, vinylquinolines, vinylisoquinolines, vinyldihydropyridines, vinylpyrrolidines, vinylpyrrolidones, vinyltetrahydropyridines, vinylpyrrolines, and the alpha- and beta-alkyl analogs of all of these. These compounds are all C-vinyl substituted compounds containing a pyridine ring.

As indicated above, the ploymerizable heterocyclic nitrogen compounds with which this invention is concerned have a tendency to polymerize spontaneously. Accordingly, a polymerization inhibitor such as t-butyl cathechol must be added to the monomer compounds to prevent polymerization during storage. It is generally the practice to remove such inhibitors by distillation before the monomer can be used in a polymerization process. It is possible to remove such inhibitors by adsorption, a process which is simpler and more economical than distillation. However, heretobefore, the presence of a large amount of color degraded material has eliminated the use of adsorption, since such color bodies would rapidly exhaust the adsorbents.

The formaldehyde stabilizers of the present invention do not inhibit polymerization of the monomers. Accordingly, there is no need to distill or otherwise treat the monomers prior to polymerization for the purpose of removing formaldehyde or formaldehyde-releasing reagents.

The color-stabilized monomers are simply admixed with a sufficient amount of polymerization inhibitor to prevent polymerization during the desired period of storage. The presence of this small amount of polymerization inhibitor is overcome in the polymerization reaction by using slight additional amounts of polymerization initiator in the recipe.

Thus, the use of the color stabilizers of the present invention offers additional advantages. First, in view of the fact that the formation of color bodies is inhibited, there is no need to subject the monomer to a distillation prior to polymerization thereof.

Second, the polymerization of the monomer may be conducted in the presence of the formaldehyde-stabilizers of this invention. Accordingly, any monomer present in the polymer will be stabilized against discoloration.

With respect to the concentration of stabilizer necessary, the presence of formaldehyde in an amount in the range of 0.02% to 15%, by weight, will serve to protect the monomers against discoloration. The preferred range of formaldehyde concentration is between 0.1% and 3% by weight. If a formaldehyde releasing reagent is used, the concentration of such reagent is calculated on the formaldehyde content thereof.

The following examples are illustrative of the present invention.

*Example 1*

Two 50 ml. samples of freshly distilled, colorless 2-methyl-5-vinylpyridine, containing 0.1% of tert-butyl catechol, were stored in two glass stoppered Erlenmeyer flasks. To one flask was added 0.35 g. of 37% formalin solution (equivalent to 0.26% formaldehyde on the weight of the vinylpyridine). The flasks were then stored at room temperature. At the end of ten days, the contents of the flask without the formalin was dark yellow in color, while the contents of the flask containing the formalin was colorless.

*Example 2*

Example 2 substantially duplicated Example 1, except that 4-vinylpyridine was used instead of 2-methyl-5-vinylpyridine.

At the end of ten days the contents of the flask without the formalin was markedly darker in color than the contents of the flask containing formalin.

*Example 3*

Four 50 ml. samples of freshly distilled, colorless 2-vinylpyridine, containing 0.1% of tert-butylcatechol, were stored in four glass stoppered Erlenmeyer flasks. The following materials were added to the respective flasks:

(1) Nothing (control);
(2) 0.3 g. of 37% formalin solution;
(3) 0.5 g. of powdered sodium formaldehyde sulfoxylate;
(4) 0.5 g. of powdered paraformaldehyde.

The flasks were stored at room temperature for one week. The colors of the contents at the end of the one week period were as follows:

(1) Brown
(2) Almost colorless
(3) Very pale yellow
(4) Very pale yellow

*Example 4*

A 50 ml. sample of freshly distilled, colorless 2-vinylpyridine, containing 0.1% of tert-butylcatechol was treated by addition of one gram of Rhonite R–1, an aqueous solution of dimethylol-ethyleneurea.

The flask was then stored at room temperature. After several days, the contents of the flask were examined and found to be colorless.

*Example 5*

A monomer of 2-vinylpyridine was stabilized by adding approximately 1% by weight of a 37% formalin solution, thus providing .37% by weight of formaldehyde based on the weight of the monomer. The stabilized monomer was polymerized by the conventional method of bead polymerization in which the monomer and a catalyst were dispersed in water. The product of the polymerization, after drying, was off-white.

An identical polymerization was conducted without first stabilizing the monomer. The product of such polymerization, after drying, was dark pink in color.

The color-stabilizing action of formaldehyde and the formaldehyde-releasing agents of this invention is unique in that no other carbonyl compounds tested exhibited this action. Thus, for example, acetaldehyde, butyraldehyde, benzaldehyde, acetone and glyoxal were all tested and found to be unsuccessful as color stabilizers. In addition, it was found that a stable trimer of formaldehyde, trioxane, does not act as a color stabilizer for the monomer compounds of this invention.

The examples set forth above are intended to be illustrative of the present invention, and variations, substitutions and modifications may be made therein by one skilled in the art without departing from the spirit or scope of this invention.

What we claim is:

1. A process of inhibiting color formation in a monomer of a polymerizable C-vinylpyridine compound with a color-stabilizing amount of formaldehyde.

2. A process of inhibiting color formation in a monomer of a polymerizable C-vinylpyridine compound by addition thereto of a color-stabilizing amount of a stabilizer selected from the group consisting of formaldehyde, paraformaldehyde, formalin, sodium formaldehyde sulfoxylate, and methylol-ureas.

3. The process of claim 2 in which said stabilizer is present in an amount equivalent to about 0.02 to 15 weight percent available formaldehyde.

4. The process of claim 2 in which said stabilizer is present in an amount equivalent to about 0.1 to 3 weight percent available formaldehyde.

5. A process of inhibiting color formation in a monomer of a polymerizable vinylpyridine compound represented by the formula:

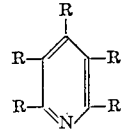

wherein each R is individually selected from the group consisting of hydrogen, alkyl, vinyl, alpha-alkylvinyl and beta-alkylvinyl radicals, at least one and not more than two of said radicals being selected from the group consisting of vinyl, alpha-alkylvinyl and beta-alkylvinyl, and the number of carbon atoms in the respective alkyl radicals is not more than 20, by addition of a color stabilizing amount of a stabilizer selected from the group consisting of formaldehyde, paraformaldehyde, formalin, sodium formaldehyde sulfoxylate, and methylol-ureas.

6. The process of claim 5 in which said polymerizable vinylpyridine is 2-methyl-5-vinylpyridine.

7. The process of claim 5 in which said polymerizable vinylpyridine is 2-vinylpyridine.

8. The process of claim 5 in which said polymerizable vinylpyridine is 4-vinylpyridine.

9. The process of claim 7 in which the stabilizer is present in an amount equivalent to about 0.02 to 15 weight percent available formaldehyde.

10. A monomeric polymerizable C-vinylpyridine having incorporated therein paraformaldehyde in an amount equivalent to about 0.02 to 15 weight percent available formaldehyde.

11. A monomeric polymerizable C-vinylpyridine having incorporated therein formalin in an amount equivalent to about 0.02 to 15 weight percent available formaldehyde.

12. A monomeric polymerizable C-vinylpyridine having incorporated therein sodium formaldehyde sulfoxylate in an amount equivalent to about 0.02 to 15 weight percent available formaldehyde.

13. A monomeric polymerizable C-vinylpyridine containing a color-stabilizing amount of paraformaldehyde.

14. A monomeric polymerizable C-vinylpyridine containing a color-stabilizing amount of formalin.

15. A monomeric polymerizable C-vinylpyridine containing a color-stabilizing amount of sodium formaldehyde sulfoxylate.

16. A process of inhibiting color formation in a monomer of a polymerizable C-vinyl substituted compound containing a pyridine ring with a color-stabilizing amount of a stabilizer selected from the group consisting of formaldehyde, paraformaldehyde, formalin, sodium formaldehyde sulfoxylate and methylol-ureas.

17. A process of inhibiting color formation in a monomer of a polymerizable C-vinyl substituted compound containing a pyridine ring with a color-stabilizing amount of formaldehyde.

18. A process of inhibiting color formation in a monomer of a polymerizable C-vinylpyridine compound during storage with a compound which liberates a color-stabilizing amount of formaldehyde under the conditions of storage at room temperature.

19. A monomeric polymerizable C-vinylpyridine having incorporated therein a methylol-urea in an amount equivalent to about 0.02 to 15 weight percent available formaldehyde.

20. A monomeric polymerizable C-vinylpyridine having incorporated therein dimethylolethyleneurea in an amount equivalent to about 0.02 to 15 weight percent available formaldehyde.

21. A monomeric polymerizable C-vinylpyridine containing a color-stabilizing amount of a methylol-urea.

References Cited by the Examiner
UNITED STATES PATENTS

| | | | |
|---|---|---|---|
| 2,878,213 | 3/1959 | Jenkins et al. | 260—45.7 X |
| 2,878,227 | 3/1959 | Vcci et al. | 260—45.7 X |
| 2,882,253 | 4/1959 | Lefferdink et al. | 260—45.7 X |
| 2,962,476 | 11/1960 | Verburg | 260—45.7 X |
| 2,980,642 | 4/1961 | Bushnell et al. | 260—45.7 X |
| 2,982,753 | 5/1961 | Holmes et al. | 260—45.7 X |

LEON J. BERCOVITZ, *Primary Examiner.*

DONALD E. CZAJA, *Examiner.*